United States Patent
Crawford et al.

[11] 3,826,231
[45] July 30, 1974

[54] AUTOMATIC ANIMAL FEEDER

[76] Inventors: Beverley Crawford, 315 E. 65th St.; Genelle Jenkins, 107 E. 60th St., both of New York, N.Y. 10022

[22] Filed: July 5, 1973

[21] Appl. No.: 376,894

[52] U.S. Cl. .......................................... 119/51.12
[51] Int. Cl. ............................................ A01k 5/02
[58] Field of Search.......... 119/51.11, 51.12, 51.13, 119/51.14, 51.15, 51, 56

[56] References Cited
UNITED STATES PATENTS
2,528,742  11/1950  Coffing ............................ 119/51.12
2,791,984  5/1957  Franklin .......................... 119/51.12
3,468,291  9/1969  Allen ............................... 119/51.12

Primary Examiner—Hugh R. Chamblee
Attorney, Agent, or Firm—Sandoe, Hopgood & Calimafde

[57] ABSTRACT

A pet feeding apparatus includes a tray assembly having a number of compartments in which food and/or liquids can be placed. The tray assembly is mounted on a rotating housing and is partially enclosed by a cover having at least one aperture which provides access to the tray compartment adjacent to the aperture. A timer activates a motor which rotates the tray assembly beneath the cover so that the cover aperture provides access to the various tray compartments at predetermined time intervals.

10 Claims, 8 Drawing Figures

PATENTED JUL 30 1974 3,826,231

AUTOMATIC ANIMAL FEEDER

BACKGROUND OF THE INVENTION

Pet animals must be fed on a fairly regular schedule. This can be inconvenient if the owner of the pet can not be present when it is necessary to feed the animal. One solution might be to provide enough food for the pet for the entire period during which the owner must be absent. Many animals, however, will eat too much at one time so that they become ill or at least exhaust the food supply too soon and go hungry before the end of the period when the owner is absent.

The present invention discloses novel pet feeding apparatus which solves this problem by providing predetermined amounts of food and/or liquid for the pet animal at time intervals selected by the pet's master. In the novel pet feeder of this invention individual servings of pet food or liquids are placed in compartments of a rotating tray assembly. A cover encloses some of the compartments to protect the food therein from dirt and to prevent the animal from gaining access to the food in the enclosed compartments until the desired time.

BRIEF DESCRIPTION OF THE INVENTION

Pet feeding apparatus includes a base plate, a housing rotatably mounted on the base plate, and drive means arranged to rotate the housing. A tray assembly, including a plurality of compartments, is removably attached to the housing. A cover resting on the base plate encloses the tray assembly and includes at least one aperture which is arranged to give access to one of the tray compartments. A timer activates the drive means at predetermined time intervals to rotate the housing and the attached tray assembly. The rotating tray assembly activates a switch which stops the rotation as each tray compartment moves to a position adjacent to the cover aperture.

DESCRIPTION OF THE INVENTION

Figure 1:
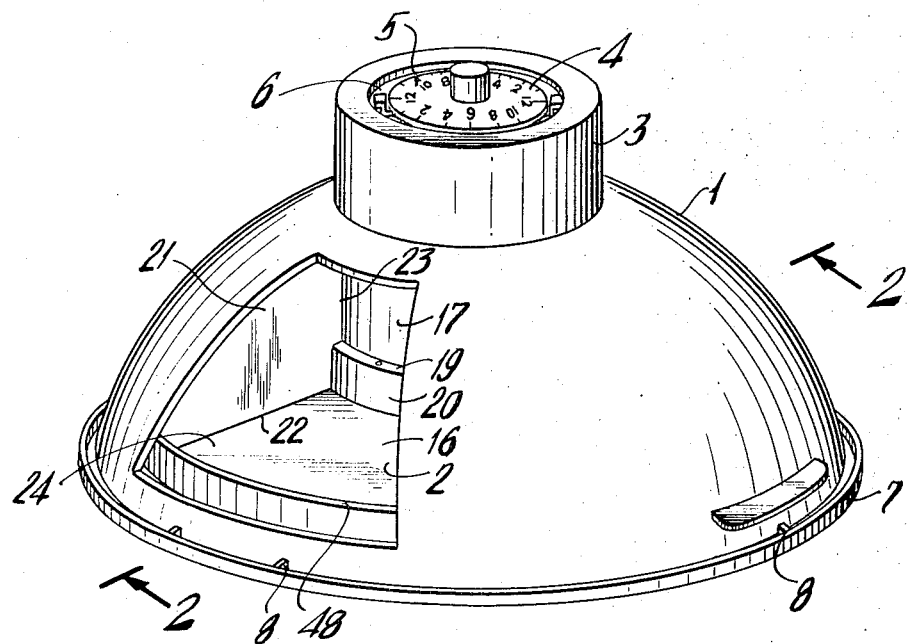
FIG. 1 is a perspective view of the preferred embodiment of the improved animal feeder of this invention.

The preferred embodiment of the improved pet feeding apparatus will now be described with reference to the accompanying drawings. Referring to FIG. 1 the improved pet feeding apparatus of this invention includes a cover 1, which is hemispherical in shape having an aperture 2. The cover includes a cylindrical portion 3 at the top. A timer 4 is mounted within this cylindrical portion. The dial 5 of the timer 4 extends through an aperture 6 in the top of said cylindrical portion 3, so that the dial is accessible from outside cover 1. The cover 1 is supported by a base plate 7 which can be made of plastic, metal or other suitable material. The base plate 7 includes a plurality of upwardly projecting tabs 8. A number of matching apertures 9 are provided in the lower edge of cover 1 to fit over projections 8 and hold cover 1 firmly on the base 7.

A cylindrical housing 10 has a flange 11 extending outwardly from the lower portion of said housing and a shorter cylindrical portion 12 of larger circumference extending between the flange 11 and a plate 13 which is mounted on the base plate 7. A plurality of pins 14 extend upward from the flange 11.

A tray assembly 15 includes a ring-like base portion 16 surrounding a cylindrical central wall 17 which defines a central aperture 18. The lower part of central wall 17 includes an outwardly extending flange portion 19 and a further cylindrical portion of larger circumference 20. A number of three sided partitions 21 having a horizontal edge 22 attached to the ring-like portion 16 and a vertical edge 23 attached to the central wall 17 divide the tray assembly 15 into a plurality of wedge shaped separated compartments 24. A low outwardly sloping ridge 48 extends around the periphery of each compartment 24 to prevent the contents of the compartment 24 from spilling out. The third side 25 of the partitions 21 defines a curve extending from the top of central wall 17 to the outer edge of ring-like portion 16. The curved configuration of the upper side of partitions 21 permits the cover 1 to fit over the tray assembly 15.

A motor 26 is mounted within housing 10 and attached to a suitable source of power not shown. A shaft 27 extends downward from the motor 26 to connect the motor to a gear train 50. Gears 28, 29, 30, 31 and 32 are attached to shaft 27. Shafts 33 and 34 are mounted on the plate 13 and extend upward. Gears 35 and 36 are mounted on shaft 34 and gears 37, 38, 39 and 40 are attached to shaft 33. A portion 60 of flange 11 extends into the area within the housing 10. A ring gear 51 is formed on the circular inner edge of the portion 60 of flange 11. The ring gear 51 meshes with gear 35.

A microswitch 41 is mounted beneath the base plate 7. A contact portion 42 of the microswitch extends through an aperture 43 in the base plate so that the part of the contact portion extends above the base plate 7. A number of downwardly projecting trippers 44 are mounted beneath the ring-like base portion 16 of tray assembly 15.

Figure 2:
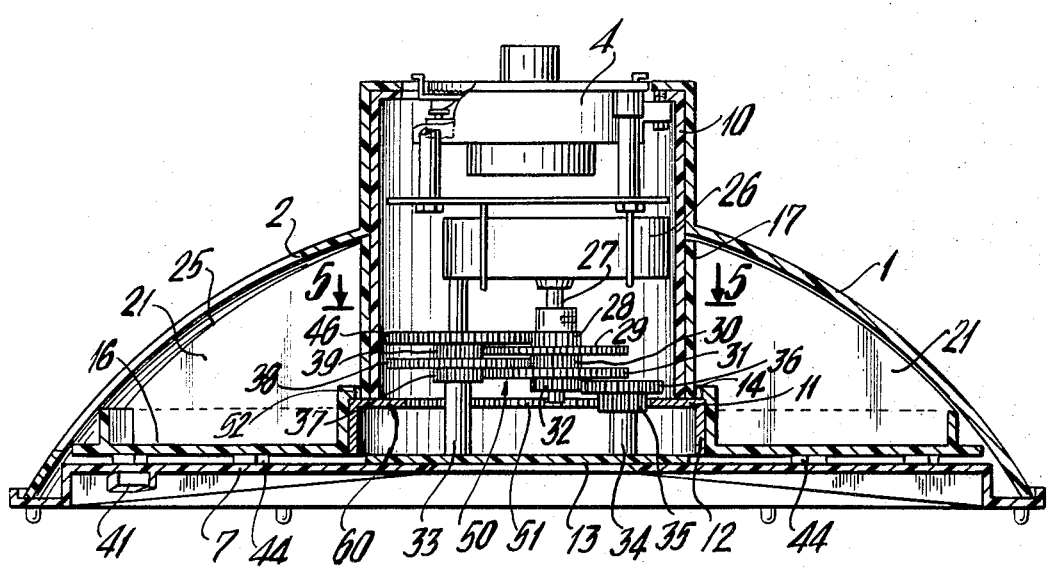
FIG. 2 is a sectional view taken substantially at the plane 2—2 of FIG. 1.
Figure 3:
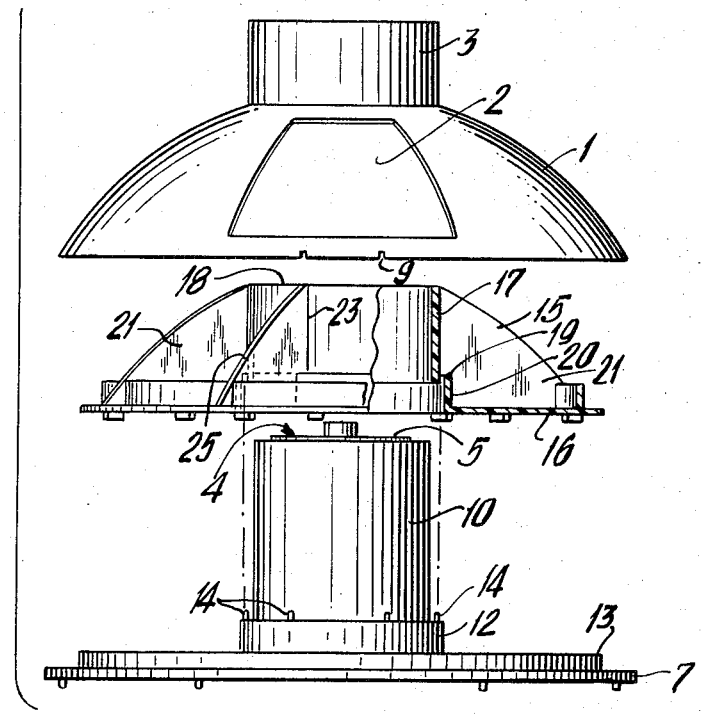
FIG. 3 is an exploded front perspective view of the improved animal feeder.
Figure 4:
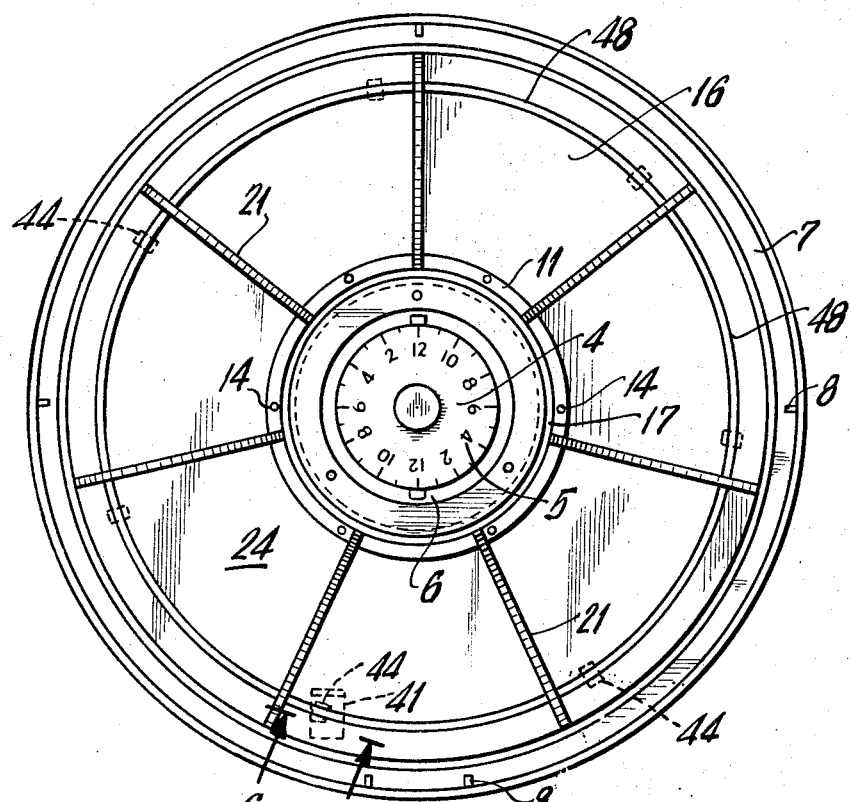
FIG. 4 is a top plan view of the animal feeder with the cover removed.
Figure 5:
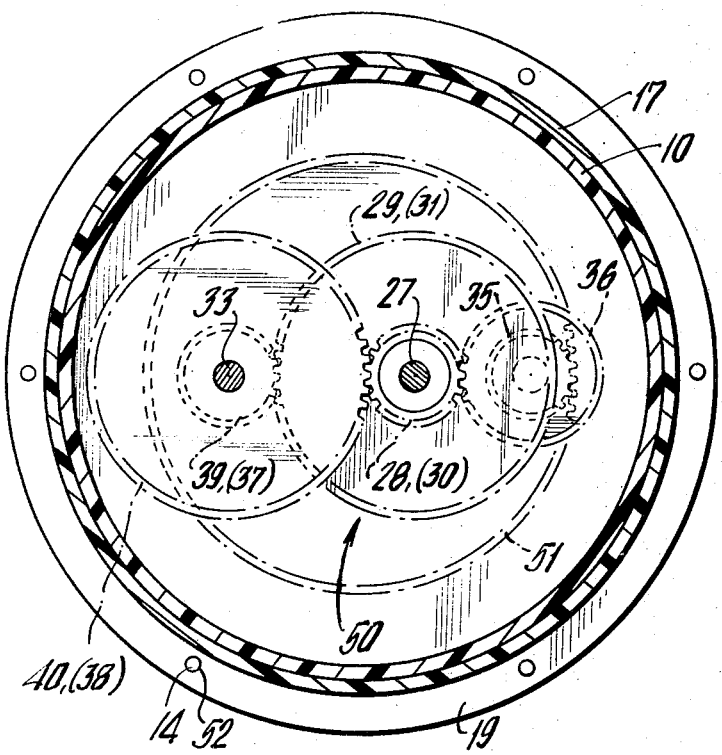
FIG. 5 is a sectional view taken substantially at the plane 5—5 in FIG. 2.
Figure 6:
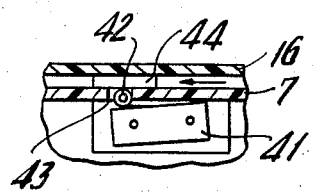
FIG. 6 is a sectional view taken substantially at the plane 6—6 of FIG. 4.

As can be seen in FIGS. 2 and 3, the housing 10 surrounds most of the electrical and/or mechanical parts of the apparatus including the timer 4, the motor 26 and the gear train 50 to protect these parts from foreign material such as the pet food which might otherwise enter this area and prevent the proper functioning of these parts. Tray assembly 15 is configured so that the central cylindrical aperture 18 fits over housing 10 leaving the dial 5 of the timer 4 exposed. The upwardly extending pins 14 on flange 11 mate with corresponding apertures 52 in outwardly extending flange portion 19 of tray assembly 15 so that assembly 15 is attached to and will move with housing 10. This mounting arrangement of tray assembly 15 facilitates the removal of the assembly for cleaning. Cover 1 fits over the tray assembly 15 and rests on the base plate 7. Tabs 8 on base plate 7 mate with matching apertures 9 on cover 1. Tabs 8 and apertures 9 are arrayed non-symmetrically around the circumference of cover 1 and base plate 7 to insure that the orientation of the cover 1 and its aperture 2 is always the same with respect to the base plate 7.

Cover 1 is easily removable to gain access to tray assembly 15. With cover 1 removed the compartments 24 are accessible and any desired pet food can be placed in them. The cover 1 is then replaced enclosing all of compartments 24 except the compartment adjacent to aperture 2 and preventing the animal to be fed from gaining access to any compartment except the one adjacent to aperture 2.

Figure 7:
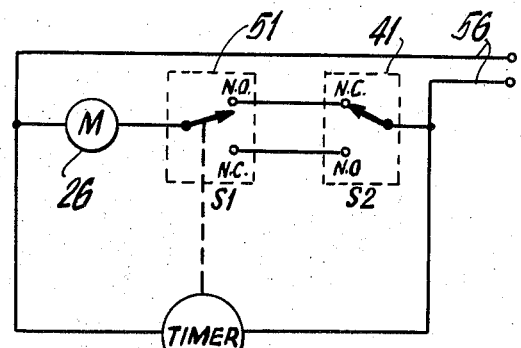
FIG. 7 is a schematic view of the electric system of the improved animal feeder.

The novel pet feeder of this invention provides food for a pet at periodic intervals as will be described below. The dial 5 on timer 4 can be set for any desired feeding time or times during the day. When the timer 4 reaches the desired feeding time it causes a switch 51 in FIG. 7 to move from contact NC to contact NO, thereby completing an electrical circuit between power supply wires 56 and electric motor 26 through contact NO of switch 51 and contact NC of the microswitch 41. Completion of this circuit activates the motor 26 causing it to rotate shaft 27 in a first direction. This in turn causes driven gears 28, 29, 30, 31 and 32 which are attached to shaft 27 to rotate in the same direction as shaft 27. Gears 28, 29, 30 and 31 engage respectively gears 40, 39, 38 and 37 which are mounted on shaft 33 causing these gears to turn in a direction opposite to the first direction. Gears 36 and 35 are attached to shaft 34 and arranged so that gear 36 meshes with driven gear 32, causing gear 36 and shaft 34 to rotate in a direction opposite to the first direction. Gear 35, which is mounted on and rotates with shaft 34, meshes with ring gear 51 which is formed in the inwardly extending portion 60 of flange 11. Rotation of gear 35 acting through ring gear 51 causes housing 10 to rotate in the first direction. Tray assembly 15 which is attached to housing 10 by upwardly extending pins 14 rotates with the housing 10. Cover 1 which is mounted on stationary base plate 7 does not rotate so that aperture 2 remains in the same position relative to the base 7 and the various compartments 24 of the tray assembly 15 are rotated in turn to a position adjacent to aperture 2.

One of trippers 44 is mounted on the underside of the tray assembly 15 beneath each compartment 24. When one of the trippers 44 moves over the microswitch 41 the contact portion 42 of the microswitch is depressed causing the microswitch to move from contact NC to contact NO in FIG. 7, thereby cutting off the electrical current to the motor 26. Each tripper 44 is arranged so that the motor 26 is cut off when the compartment 24 beneath which that tripper 44 is mounted is arranged behind aperture 2. The food within that compartment is then accessible to the pet to be fed.

After an additional time period timer 4 causes the switch 51 to move from contact NO to contact NC thereby reconnecting the electric current to the motor 26 briefly and causing the tray assembly 15 to be rotated until tripper 44 moves off the contact portion of 42 of microswitch 41 thereby releasing the microswitch 41 to move from contact NO to contact NC. This interrupts the electric circuit and stops the motor. The apparatus is now prepared for the next feeding cycle.

Since the tray assembly 15 is only attached to the housing 10 by pins 14 which extend through apertures 52 in the tray assembly, the tray assembly can be easily removed for cleaning. Since animal food is placed in the tray compartments 24 it will be necessary to clean the compartments between uses and the ease with which the tray assembly can be dismounted is an advantage. The tray assembly includes no moving parts and can be immersed in water for cleaning without damage to the mechanism. If desired, tray assemblies having different compartment arrangements can be mounted interchangably on the housing 10. Housing 10 completely encloses the motor 26, the timer 4 and the gear train 50 protecting these parts from the food or liquids in the tray assembly which could cause malfunction if they came in contact with these parts.

Figure 8:
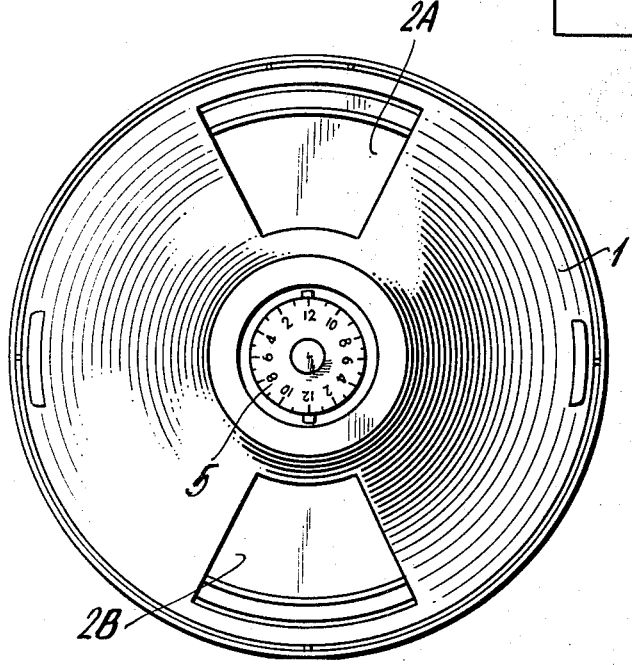
FIG. 8 is a top plan view of an alternate embodiment of the improved animal feeder.

An additional embodiment of the pet feeding apparatus is shown in FIG. 8. In this embodiment two feeding apertures 2a and 2b are provided in cover 1. This embodiment could be used to feed two animals simultaneously or the compartments exposed by the apertures 2a and 2b could contain different foods or liquids for the same animal. The embodiment disclosed in FIG. 8 operates exactly as the first embodiment described above.

Although the present invention has been described in conjunction with the above preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. Pet feeding apparatus including:
   a base plate;
   a housing rotatably mounted in said base plate;
   drive means arranged to rotate said housing;
   a tray assembly;
   said tray assembly including a plurality of compartments;
   means to attach said tray assembly to said housing;
   a cover having at least one aperture;
   said cover resting on said base plate;
   a timer;
   means responsive to said timer to cause said drive means to rotate said housing and said tray assembly; and
   means responsive to the rotation of said tray assembly to stop said drive means when one of said compartments in said tray assembly is adjacent to said at least one aperture in said cover.

2. Pet feeding apparatus as claimed in claim 1, in which said tray assembly includes a flange member having a plurality of apertures and in which said means to attach said tray assembly to said housing includes a plurality of upwardly extending pins mounted on said housing, said pins being arranged to extend into said apertures in said flange member.

3. Pet feeding apparatus as claimed in claim 1, in which said drive means includes an electric motor; and said means responsive to the rotation of said tray assembly to stop said drive means includes a switch connected in series with said electric motor, and a source of electric current, said switch being mounted adjacent to said base plate so that a portion of said switch extends above the level of said base plate, a plurality of projections on said tray assembly, said projections being arranged so that they engage said portion of said switch which extends above said base plate causing said switch to disconnect said motor from said source of electric current.

4. Pet feeding apparatus as claimed in claim 3, in which said means responsive to said timer activates said motor briefly to cause said tray assembly to rotate and said projection to move out of engagement with said portion of said switch.

5. Pet feeding apparatus as claimed in claim 1, including indexing means arranged on said base plate to insure that said cover rests on said base plate so that said cover aperture opens into only one of said plurality of compartments.

6. Pet feeding apparatus as claimed in claim 5, in which said cover includes a plurality of additional small apertures asymmetrically arranged about the edge of said cover which rests on said base plate, and said indexing means includes a plurality of tabs on said base plate arranged to extend into said additional apertures.

7. Pet feeding apparatus including:
a stationary base plate;
a rotatable housing mounted on said base plate;
a timer;
drive means arranged to rotate said housing;
said timer and said drive means being mounted within said housing;
a tray assembly;
said tray assembly including a cavity which is shaped to slidably fit over said housing causing said tray assembly to rotate with said housing;
a plurality of compartments arranged about the periphery of said tray assembly;
a stationary cover having at least one aperture resting on said base plate so that said cover substantially surrounds said tray assembly and said housing, said at least one aperture being adjacent to the periphery of said tray assembly;
means responsive to said timer to activate said drive means causing the rotation of said housing and said tray assembly; and
means responsive to said rotation to stop said rotation when one of said compartments of said tray assembly is adjacent to said at least one aperture in said cover.

8. Pet feeding apparatus as claimed in claim 7, in which said means responsive to said rotation includes a switch mounted adjacent to said base plate, said switch including a moveable portion; and a plurality of projections on said tray assembly, said projections being arranged so that they engage said moveable portion of said switch.

9. Pet feeding apparatus as claimed in claim 8, in which one of said plurality of projections is located adjacent to each one of said compartments on said tray assembly so that said one projection engages said moveable portion of said switch when the adjacent compartment has rotated to a position adjacent to said at least one aperture in said cover.

10. Pet feeding apparatus as claimed in claim 9, in which said means responsive to said timer briefly activates said drive means causing said tray assembly to rotate slightly and said projection to move out of engagement with said moveable portion of said switch.

* * * * *

UNITED STATES PATENT OFFICE
CERTIFICATE OF CORRECTION

Patent No. 3,826,231                     Dated   July 30, 1974

Inventor(s)   B. CRAWFORD AND G. JENKINS

It is certified that error appears in the above-identified patent and that said Letters Patent are hereby corrected as shown below:

Claim 1, Column 4, line 36

"in" should be --on--

Signed and sealed this 8th day of October 1974.

(SEAL)
Attest:

McCOY M. GIBSON JR.                C. MARSHALL DANN
Attesting Officer                  Commissioner of Patents